United States Patent
Morokuma et al.

(10) Patent No.: US 6,878,483 B2
(45) Date of Patent: Apr. 12, 2005

(54) SEPARATOR FOR SOLID ELECTROLYTE CONDENSER AND SOLID ELECTROLYTE CONDENSER USING THE SAME

(75) Inventors: Munehiro Morokuma, Kadoma (JP); Yukihiro Nitta, Kadoma (JP); Taiji Mizobuchi, Kochi-ken (JP); Teruyuki Jinzenji, Nankoku (JP); Masaaki Yanase, Kochi (JP)

(73) Assignees: Nippon Kodoshi Corporation, Kochi-ken (JP); Matsushita Electric Industrial Co., Ltd., Osaka (JP)

( * ) Notice: Subject to any disclaimer, the term of this patent is extended or adjusted under 35 U.S.C. 154(b) by 479 days.

(21) Appl. No.: 10/074,228

(22) Filed: Feb. 14, 2002

(65) Prior Publication Data

US 2002/0117394 A1 Aug. 29, 2002

(30) Foreign Application Priority Data

Feb. 20, 2001 (JP) ........................................ 2001-044215

(51) Int. Cl.$^7$ ............................................... H01M 4/00
(52) U.S. Cl. .................... 429/94; 429/133; 429/134; 429/135; 429/165; 429/247; 429/248; 429/249
(58) Field of Search .......................... 429/94, 133, 134, 429/135, 165, 247, 248, 249

(56) References Cited

U.S. PATENT DOCUMENTS 5,733,661 A * 3/1998 Ue et al. ..................... 428/426
6,348,286 B1 * 2/2002 Tanaka et al. ............... 429/247

* cited by examiner

Primary Examiner—Bruce F. Bell
(74) Attorney, Agent, or Firm—Shlesinger, Arkwright & Garvey LLP

(57) ABSTRACT

An object of the present invention is to provide a separator which is excellent in sticking and adhesion capability with the solid electrolyte, physically strong and highly heat-resistive and to provide a solid electrolyte condenser which is excellent in the impedance characteristic and leak current characteristic. In a solid electrolyte condenser comprising an anode foil, a cathode foil, a separator, the separator is made of a nonwoven fabric containing polyester resin or its derivative manufactured by the wet method. The condenser element is formed by rolling the anode foil and the cathode foil together with the separator between them. The solid electrolyte is provided between the anode foil and the cathode foil of the condenser element.

18 Claims, 3 Drawing Sheets

| | separator | | | | melting or softening point of fiber (°C) | capacitance (μF, 120Hz) | leak current (μA) | number of short circuits | impedance (mΩ 300kHz) | |
| --- | --- | --- | --- | --- | --- | --- | --- | --- | --- | --- |
| | thickness (μm) | areal weight (g/m²) | density (g/cm³) | tensile strength (N/15mm) | | | | | befor reflow | after reflow |
| Embodiment 1 | 40 | 25 | 0.63 | 17.6 | 260, 240 | 221 | ≦1 | 0 | 15 | 17 |
| Embodiment 2 | 40 | 25 | 0.63 | 17.6 | 260, 240 | 222 | ≦1 | 0 | 11 | 13 |
| Embodiment 3 | 40 | 25 | 0.63 | 17.6 | 260, 240 | 220 | ≦1 | 0 | 15 | 19 |
| Embodiment 4 | 40 | 25 | 0.63 | 17.6 | 260, 240 | 221 | ≦1 | 0 | 15 | 17 |
| Embodiment 5 | 50 | 20 | 0.40 | 15.6 | 260, 240 | 219 | ≦1 | 0 | 14 | 16 |
| Embodiment 6 | 50 | 16 | 0.32 | 14.7 | 240, 170 | 220 | ≦1 | 0 | 14 | 16 |
| Embodiment 7 | 40 | 25 | 0.63 | 17.6 | 260, 240 | 222 | ≦1 | 0 | 8 | 8 |
| Ref. Example 1 | 210 | 60 | 0.29 | 5.9 | 750 | — | — | — | — | — |
| | A lot of disadvantages in working environment. Difficult to roll condenser element due to poor strength of fiber. Manufactured condenser product thicker than prescribed. | | | | | | | | | |
| Ref. Example 2 | 50 | 25 | 0.50 | 6.9 | 260 | 191 | 48 | 5 | 15 | 22 |
| Ref. Example 3 | 50 | 25 | 0.50 | 22.6 | — | 181 | 55 | 11 | 31 | 42 |
| Ref. Example 4 | 50 | 25 | 0.50 | 11.8 | 170 | 175 | 53 | 6 | 40 | 80 |

SEPARATOR FOR SOLID ELECTROLYTE CONDENSER AND SOLID ELECTROLYTE CONDENSER USING THE SAME

BACKGROUND OF THE INVENTION

1. Technical Field of the Invention

The present invention relates to a separator for a solid electrolyte condenser wherein a solid electrolyte lies between an anode foil and a cathode foil, and relates to a rolled type solid electrolyte condenser using the separator.

2. Description of the Prior Art

As electronic devices are operated at higher frequency, the electrolyte condenser also is being desired to have a superior impedance characteristics at the higher frequency and a large capacitance. Recently, the rolled type solid electrolyte condenser using the solid electrolyte of high conductivity polymer has been studied in order to reduce the impedance at the higher frequency. On the other hand, the rolled type condenser wherein the anode foil and the cathode foil is rolled with the separator between has an advantage in increasing the capacitance, compared with laminated type condenser wherein the electrode foils are laminated, because the structure of the rolled type is suitable to increase the capacity. Therefore, the rolled type solid electrolyte condensers using the conductive polymer have been already manufactured.

In the rolled type solid electrolyte condenser, the separator for avoiding a contact of the anode foil with the cathode foil is indispensable. For example, one of the separator is the so-called carbonized paper which is a conventional electrolyte paper such as Manila hemp or kraft paper which is rolled in order to form the condenser and then is heated or other treatment for carbonization. Further, a nonwoven fabric of which main component is glass fiber or a resin manufactured by the dry melt blow method.

Further, in JP 10-340829 A (1998), the separator of the solid electrolyte condenser is made of a nonwoven fabric of which main component is a synthetic fiber which is a vinylon (a resin on the basis of polyvinylalchol, or a mixed nonwoven fabric of vinylon and other resin or resins.

The rolled type solid electrolyte condenser using the above-mentioned carbonized paper is manufactured by heating the condenser at a temperature higher than 250° C. However, a insulating oxide coat is damaged by the heating, thereby increasing a leak current. Further, the condenser is short-circuited at a higher rate, even when the condenser is repaired by aging. Further, the condenser of this type has a disadvantage that a highly oxidization resistive and costly silver plated lead wire must be used, because the plated layer such as tin/zinc layer of the conventional lead wire of the solid electrolyte condenser is oxidized by the heating, thereby reducing the wetting to a solder at a lead wire portion of the conventionally plated wire of a finished product.

The glass fiber nonwoven fabric electrolyte paper causes bad influences to working environments, due to scattering of the needle-like glass fibers during cutting and rolling them. Further, a bending strength of the paper during rolling is not sufficient enough to prevent the short-circuit in the finished products. Further, the glass fiber paper is thin and is difficult to be manufactured at a thickness of 40 to 50 $\mu$m. Even if a paper is manufactured at that thickness, the strength of the paper is so small that the paper can hardly be rolled. Thus, the glass fiber paper is not suitable for manufacturing recent small-sized electronic parts.

Further, a tensile strength of the nonwoven fabric of resin by dry method such as the melt blow method, vinylon nonwoven fabric and mixed nonwoven fabric of vinylon and other resins is weak, compared with the electrolyte paper. Therefore, the separator of the above-mentioned nonwoven fabric is frequently broken during rolling process of manufacturing the condenser, thereby causing a high rate of short circuit during the aging. Furthermore, it is difficult to manufacture a low impedance solid electrolyte condenser at higher frequency, because the conductive polymer can not easily be held to the separator due to an influence of adhesives for adhering the resin fibers in order to lower the impedance. Further, vinylon has several disadvantages, due to its poor heat resistivity, that vinylon condenser can not be used at a higher temperature, vinylon is easily dissolved during high temperature reflow of soldering, a sealing portion is easily damaged due to inner pressure rise due to an outgas, and electrical characteristics of the solid electrolyte condenser are easily degraded.

On the other hand, polyethylenedioxythiophene and polypyrrole is known as conductive polymers for the solid electrolyte. They are manufactured by the chemical oxydization polymerization of ethylenedioxythiophene by using an optimum oxydizing agent. However, it is difficult to hold them to the carbonized paper, the glass fiber nonwoven fabric and the nonwoven fabric of polypropylene manufacture by the wet method. Therefore, the impedance is increased and the capacitance is decreased, due to a separation of the conductive polymer from the separator due to a thermal stress and other factors. Accordingly, the conventional solid electrolyte condenser has a disadvantage that a size per capacitance ratio of the condenser using the above-mentioned conductive polymers becomes greater than that of a condenser using an electrolytic solution.

SUMMARY OF THE INVENTION

An object of the present invention is to solve various disadvantages of the above-mentioned conventional condensers. Concretely, the present invention provides a separator of excellent sticking and adhering capabilities and physical strength and thermal resistivity for use of the solid electrolyte condenser. The present invention also provides a solid electrolyte condenser of excellent impedance characteristic and leak current characteristic, by using the separator of the present invention.

The separator for the solid electrolyte condenser of the present invention, wherein the separator between the anode foil and the cathode foil is provided with the solid electrolyte, contains a nonwoven fabric containing the polyester resin and its derivatives manufactured by the wet method of which fiber diameter is 0.01 to 3 dtex, while the solid electrolyte condenser of the present invention is a rolled type condenser wherein the anode foil and the cathode foil and the above-mentioned separator between them are rolled and the solid electrolyte is provided between the anode foil and the cathode foil.

Further, the separator is made of the polyester fiber of polyethyleneterephthalate family containing carboxyaJkoxybenzenesulfonic acid and its derivatives which are 3,5 -dicarboxyaJkoxybenzenesulfonic acid and its derivatives.

Further, the separator is made of the polyester fiber of polyethyleneterephthalte family containing aJkylgrycol and its derivatives which are diethylenegrykol and its derivatives.

Further, the separator contains the polyester fiber of the polyethyleneterephthalate family containing the copolymerization ingredients of carboxyalkoxybenzenesulfonic acid and its derivatives; and the polyester fiber of alkyleneglykol and its derivatives. Here, the concentration of the the polyester fiber of the polyethyleneterephthalate family containing the copolymerization ingredients of carboxyalkoxybenzesulfonic acid and its derivatives is greater than or equal to 50 weight %. Further, the thickness of the separator is 20 to 100 $\mu$m and its density is 0.30 to 0.70 g/cm$^3$.

Further, the solid electrolyte condenser comprises the anode foil, the cathode foil, the separator and the solid electrolyte, wherein the condenser element is manufactured by rolling a film comprising the anode foil of which surface is etched and which is provided with the insulating oxide; film on its etched surface; the cathode foil of which surface is at least etched; and the separator between the anode foil and the cathode foil, and wherein the solid electrolyte is provided between the anode foil and the cathode foil.

The solid electrolyte is a conductive polymer containing at least one material among tetracyanoquinodimathanecomplex salt and its derivatives, polypyrrole and its derivatives, polyaniline and its derivatives, polythiophene and its derivatives, polyethylenedioxythiophene and its derivatives, polyethylenedioxythiophenepolystyrenesulfonate and its derivatives. Further, the conductive polymer contains at least one binder ingredient selected among polyvinylalchol, polyvinylacetate, polycarbonate, polyacrylate, polymethacrylate, polystyrene, polyurethane, polyacrylonitiile, polybutadiene, polyisoprene, polyether, various kinds of polyesters, polyamide, polyimide, butylal resin, silicone resin, melamine resin, alkyd resin, cellulose, nitrocellulose, various kinds of epoxy resin, and all of their derivatives. Further, the polyester may be selected among polyethyleneterephthalate, carbonyl modified polyethyleneterephthalate, sulfonic acid modified polyethyleneterephthalate, polybutyleneterephthalate, carbonyl modified polyethyleneterephthalate, sulfonic acid modified polybutyleneterephthalate, while the epoxy resin may be selected among bisphenol A type epoxy, bisphenol F type epoxy, alicyclicepoxy, nitrile rubber modified epoxy.

Due to the separator and the solid electrolyte condenser using the same of the present invention, the impedance characteristic at higher frequency is greatly improved, because the sticking and adhesion of the separator with the conductive polymer is extremely good. Concretely, the compatibility parameter of the polyester fiber of polyethyleneterephthalate family containing carboxyalkoxybenzenesulfonic acid and its derivatives as a copolymerization ingredient is similar to that of the solid electrolyte of polyethylenedioxythiophene family. Therefore, the separator fiber sticks and adheres strongly with the solid electrolyte, thereby lowering the electrical resistance between the anode foil and the cathode foil, and accordingly lowering greatly the impedance at higher frequency.

Further, according to the present invention, the tensile strength against cut-offs of the separator during rolling the condenser element is guaranteed, thereby reducing the probability of generating the short circuits during aging and preventing lowering of a conductive polymer retention capability due to an influence of the adhesives for adhering mutually the resin fibers.

Particularly, the separator of the present invention is a nonwoven fabric containing polyester resin and its derivatives manufactured by the wet method. Due to the above-mentioned nonwoven fabric, the strength of the fiber itself becomes increased, rolling capability of the condenser element and its heat-resistivity are improved, the cut-offs of the separator during rolling the condenser element occurs less frequently and the probability of occurring the short circuits during an aging treatment and after reflow soldering are decreased, a leak current is controllable, the upper limit temperature for the reflow soldering is lowered, and the reflow soldering of the planar mount type condenser product similar to those executed for other electronic parts becomes possible, and the heat-resistivity of the solid electrolyte condenser used in various kinds of electronic apparatuses are improved greatly than before. Therefore, the solid electrolyte of the present invention becomes used widely for various purposes.

Further, due to an introduction of the lead (Pb)-free soldering, bad influences by Pb contained in the conventional solder to the environments are avoided. Further, any disadvantage on the heat-resistivity and the electric characteristic of the condenser does not occur, even when the temperature for reflow soldering is raised.

Furthermore, the conventional manufacturing step for carbonizing the condenser element after the heating treatment is not required, and further, there is no need to remove the binder after forming the condenser element. Therefore, the manufacturing of the condenser is simplified, and particularly, the leak current increase of the condenser due to the break-down of the element shape or the stress by the heat treatment hardly occur.

BRIEF EXPLANATION OF THE DRAWINGS

FIG. 3 is a table showing a result for comparing the Embodiments 1 to 7 with the Reference Examples 1 to 4, concerning electrostatic capacity (frequency 120 Hz), impedance frequency 300 kHz), leak current (for 2 minutes after applying rated voltage 16 V), number of generated short circuits during aging and impedance frequency 300 kHz) after reflow treatment.

PREFERRED EMBODIMENT OF THE INVENTION

Concrete and preferred embodiments of the separator for the solid electrolyte condenser and the solid electrolyte condenser using the separator of the present invention are explained. Here, a typical method for manufacturing the rolled type aluminum electrolyte condenser using conductive polymer and the solid electrolyte such as TCNQ is explained briefly. First, A film of a separator sandwitched by an anode aluminum foil with an anode lead and a cathode aluminum foil with a cathode lead is prepared, and rolled in order to obtain a condenser element. Then, a solid electrolyte layer is provided between the anode foil and the cathode foil inside the condenser element. When the conductive polymer is employed, a polymerizing liquid containing at least a heterocyclic monomer is dipped in the condenser element, thereby polymerizing chemically or electrochmical the heterocyclic monomer. When TCNQ is employed as the solid electrolyte, liquid TCNQ at a temperature near the melting point is dipped in the condenser element, and then cooled, hereby solidifying the liquid TCNQ. Then, the condenser element provided with the solid electrolyte layer is enclosed in a bottomed cylinder case and is sealed by a sealing agent such as a rubber. The anode lead and the cathode lead are taken out through the sealing agent, thereby becoming outside lead terminals.

Figure 1:
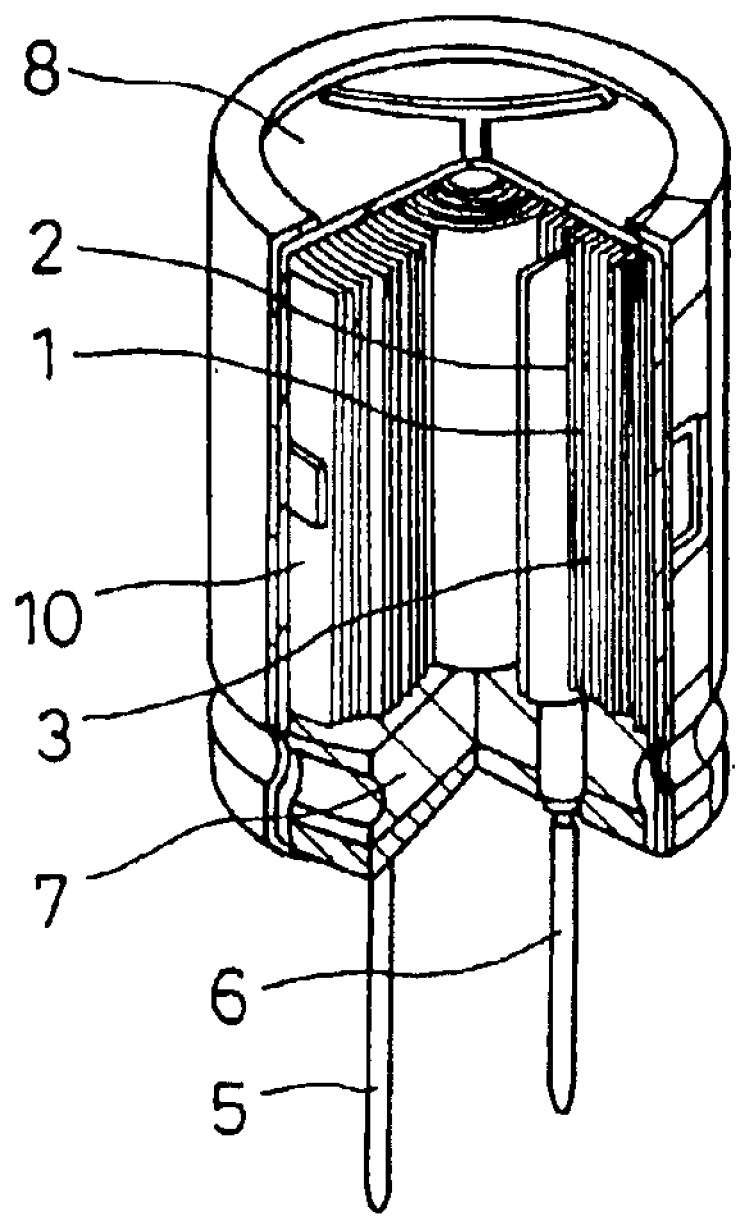
FIG. 1 is a partial cutaway perspective view of the solid electrolyte condenser of the present invention.
Figure 2:
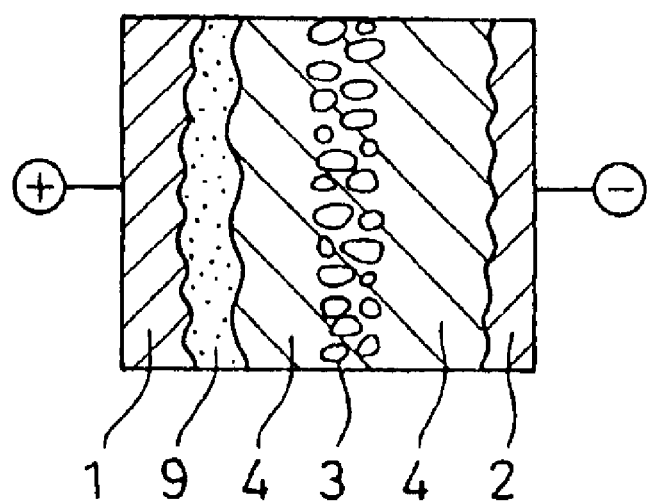
FIG. 2 is a conceptional view of a principal portion of the condenser element as shown in FIG. 1.

FIG. 1 is a partial cutaway perspective view of the solid electrolyte condenser of the present invention. FIG. 2 is a conceptional view of a principal portion of the condenser element. As shown in FIGS. 1 and 2, the aluminum anode foil 1 is etched to roughen its surface and is anodic-oxydized to form the insulating oxydized film 9 on the surface, while the aluminum cathode foil 2 is at least etched to roughen its surface and may be anodic-oxydized to form the insulating oxydized film 9 on the surface. The anode foil 1 and the cathode foil 2 which hold between them the separator 3 of the nonwoven fabric manufactured by the wet method are rolled and the solid electrolyte 4 is formed between the anode foil 1 and the cathode foil 2, thereby obtaining the condenser element 10.

When the opening end of the bottomed cylindrical aluminum case is sealed by rubber the sealing agent 7, after enclosing the condenser element 10 in the case, the anode lead 5 and the cathode lead 6 connected with the anode foil 1 and the cathode foil 2, respectively, is guided through the sealing agent 7 to the outside, thereby forming the solid electrolyte condenser.

The method for forming the solid electrolyte is not limited so much. For example, when the conductive polymer is employed as the solid electrolyte, single or a plurality of conductive polymer layers may be chemically polymerized, or a conductive polymer layer may be grown and formed by the electrolytic polymerization by using a chemically polymerized conductive polymer layer, a conductive metal oxide, or a conductive metal nitride as a pre-coating layer.

In the following, various concrete examples of separator 3 and the manufacturing method thereof are explained.

Separator A

A wet paper is manufactured by the wet method (papermaking method), by mixing 35% polyethylene terephthalate fiber (0.1 dtex, melting point 260° C.) containing diethylene glycol as a copolymerization ingredient and 65% polyethylene terephthalate fiber (0.2 dtex, melting point 240° C.) containing carboxybenzenesulfonic acid as a copolymerization acid ingredient and diethylene glycol as a copolymerization ingredient. Then, the wet paper is heated in order to adhere the fibers, thereby manufacturing a separator of thickness 40 μm, areal weight 25 g/m$^2$ and density 0.63 g/cm$^3$ for the solid electrolyte condenser.

Separator B

A wet paper is manufactured by the wet method (papermaking method), by mixing 35% polyethylene terephthalate fiber (1.7 dtex, melting point 260° C.) containing diethylene glycol as a copolymerization ingredient and 65% polyethylene terephthalate fiber (1.2 dtex, melting point 240° C.) containing carboxybenzenesulfonic acid as a copolymerization acid ingredient and diethylene glycol as a copolymerization ingredient. Then, the wet paper is heated in order to adhere the fibers, thereby manufacturing a separator of thickness 50 μm, areal weight 20 g/m$^2$ and density 0.40 g/cm$^3$ for the solid electrolyte condenser.

Separator C

A wet paper is manufactured by the wet method (papermaking method), by mixing 50% polyethylene terephthalate fiber (0.2 dtex, melting point 240° C.) containing carboxybenzenesulfonic acid as a copolymerization acid ingredient and diethylene glycol as a copolymerization ingredient and 50% polypropylene fiber (0.6 dtex, melting point 170° C.). Then, the wet paper is heated in order to adhere the fibers. Further, the wet paper is impregnated with polyester emulsion as a chemical binder in order to increase the strength, and then the wet paper is dried, thereby manufacturing a separator of thickness 50 μm, areal weight 16 g/m$^2$ and density 0.32 g/cm$^3$ for the solid electrolyte condenser.

The interfiber adhesion of the separator A, B and C manufactured by the conventional wet method (papermaking method) is executed by the thermal adhesion by thermal bond, the chemical adhesion by chemical bond, or their combination. The deviation of density of the nonwoven fabric by the wet method (papermaking method) is smaller than that of the nonwoven fabric by the dry method, and the tensile strength of the nonwoven fabric by the wet method (papermaking method) is greater than that of the nonwoven fabric by the dry method. Therefore, due to the separator A, B and C, the separator is less frequently broken during rolling the condenser element, thereby reducing the probability of generating short circuits.

Next, solid electrolyte condensers were manufactured by using the separator A, B and C. The embodiments thereof and reference examples are explained.

Embodiment 1 an insulating oxide film was formed on the surface of the anode foil by the anodic oxydization under the voltage 35 V Then, thus treated anode foil and the cathode foil of which surface was roughened by etching were rolled by holding the separator A between them, thereby obtaining a condenser element. Then, the condenser element was impregnated with 10 weight % ethylene glycol solution of ammonium salt of adipic acid. Thus, the electrostatic capacitance of the condenser element was 300 μF at frequency 120 Hz. Then, the condenser element was impregnated with a solution of 1 part of ethylene dioxy thiophene which is a heterocyclic monomer and 4 parts of p-toluenesulphonic acidiron(II) which is an oxydizing agent and n-buthanol which is a polymerizing solution. By leaving the condenser element at 85° C. for 60 minutes after completing the impregnation, a solid electrolyte of polyethylenedioxythiophene which is a chemically polymerized conductive polymer is formed between the anode foil and the cathode foil. Next, the condenser element was washed and dried, enclosed in the bottomed aluminum case together with a resin cured butyl rubber (containing 30 parts of butyl rubber polymer, 20 parts of carbon and inorganic fuller: 70 IRHD (international rubber hardness unit) and was sealed at the opening portion of the case by the curling treatment. Further, the lead wire terminals connected with the anode foil and the cathode foil were passed through a base plate and the lead wire portion was bent flat, thereby finishing a planar mount type solid electrolyte condenser which was of 10 mm diameter×10 mm height.

Embodiment 2

In the embodiment 1, before forming the solid electrolyte of polyethylene dioxythiophene, the condenser element was impregnated in an aqueous solution of 1.0% polyethylenedioxythiophenepolystyrenesulphonic acid By drying the condenser element at 150° C. for 5 minutes, a layer of polyethylenedioxythiophenepolystyrenesulphonate was formed. The solid electrolyte condenser was manufactured in the same manner as described in [Embodiment 1], except the above-mentioned processes.

Embodiment 3

In the [Embodiment 1], in place of polyethylenedioxythiophene, the condenser element was impregnated with tetracyanoquinodimethane complex salt (TCNQ) The above-mentioned process was executed at a temperature higher than 200° C. Then, by cooling the condenser element down to the room temperature, a solid electrolyte of TCNQ was formed in the condenser element. The solid electrolyte condenser was manufactured in the same manner as described in [Embodiment 1], except the above-mentioned processes.

Embodiment 4

The solid electrolyte condenser was manufactured in the same manner as described in [Embodiment 1], except that a mixed solution of 1 part of pyrrole as the heterocyclic monomer, 1 part of peroxosulfuric acid as the oxydizing agent, 1 part of ethanol and 3 parts of water is used.

Embodiment 5

The solid electrolyte condenser was manufactured in the same manner as described in [Embodiment 1], except that the separator B is used, in place of the separator A.

Embodiment 6

The solid electrolyte condenser was manufactured in the same manner as described in [Embodiment 1], except that the separator C is used, in place of the separator A.

Embodiment 7

The solid electrolyte condenser was manufactured in the same manner as described in [Embodiment 2], except that, in place of the aqueous solution of 1.0% polyethylenedioxythiophenepolystyrenesulfonic acid, a graft co-polymerized resin of sulfonic acid modified polyethyleneterephthalate and acryl is dissolved in the aqueous solution of 1.0% polyethylenedioxythiophenepolystyrenesulfonic acid arranged in such a manner that a solid ingredient concentration of the resin in the solution becomes 2 to 10 weight %.

Reference Example 1

The solid electrolyte condenser was manufactured in the same manner as described in [Embodiment 1], except that, in place of the separator A, a glass fiber nonwoven fabric (thickness 210 $\mu$m, areal weight 60 g/m$^2$ and density 0.29 g/cm$^3$, softening point 750° C.) was used. However, any condenser element could not be manufactured due to a remarkable bending of the separator fiber during rolling the condenser element.

Reference Example 2

The solid electrolyte condenser was manufactured in the same manner as described in [Embodiment 1], except that, in place of the separator A, a melt blow nonwoven fabric (thickness 50 $\mu$m, areal weight 25 g/m$^2$ and density 0.50 g/cm$^3$) of polyetheneteterephthalate resin (melting point 260° C.) was used.

Reference Example 3

The solid electrolyte condenser was manufactured in the same manner as described in [Embodiment 1], except that an electrolyte paper of Manira hemp (thickness 50 $\mu$m, areal weight 25 g/m$^2$ and density 0.50 g/cm$^3$) sandwitched by the anode foil and the cathode foil was rolled in order to obtain a condenser element, and the electrolyte paper between the anode foil and the cathode foil was carbonated by heating the condenser element at 275° C. for 2 hours. Here, the carbonated cellulose has not any temperature corresponding to the melting point.

Reference Example 4

The solid electrolyte condenser was manufactured in the same manner as described in [Embodiment 1], except that, in place of the separator A, a nonwoven fiber manufactured by the wet method (thickness 50 $\mu$m, areal weight 25 g/m$^2$ and density 0.50 g/cm$^3$) of polypropylene resin (melting point 170° C.).

A result for comparing the Embodiments 1 to 7 with the Reference Examples 1 to 4 is described in the table as shown in FIG. 3, concerning electrostatic capacity (frequency 120 Hz), impedance (frequency 300 kHz), leak current (or 2 minutes after applying rated voltage 16 V), number of generated short circuits during aging and impedance frequency 300 kHz) after reflow treatment (peak temperature 250° C.; a time period during which the solid electrolyte condenser is exposed at a temperature greater than or equal to 200° C., was 50 seconds). Test samples are 50 in every case, and such electrical characteristics as the electrostatic capacity, the impedance, the leak current and the electrostatic capacity after the reflow treatment are averaged about the test samples without any short circuit.

According to the table as shown in FIG. 3, the separators obtained by the Embodiments 1 to 7 are (1) the separator of polyester resin, (2) the separator containing polyethyleneterephthalate-family polyester fiber containing arboxyalkoxybenzensulfonic acid and its derivative as copolymerization ingredient and (3) the separator containing polyethyleneterephthalate-family polyester fiber containing alkyleneglycol and its derivative as copolymerization ingredient. The structure of solid electrolyte condensers is characterized in that (4) a pair of the anode foil on which surface the insulating oxide film is formed and the aluminum cathode foil of which surface is etched, sandwiches the separators (1), (2) and (3), or sandwitches separators of mixed fibers of the separators (1), (2) and (3). Further, the anode and cathode foils together with the above-mentioned separators are rolled and the solid electrolyte is provided between the anode foil and the cathode foil.

In the table as shown in FIG. 3, measurement results of thickness, areal weight, tensile strength, melting point and softening point of fiber of the separators of Embodiments 1 to 7 and Reference Examples 1 to 4, and electrostatic capacity, leak current, number of generated short circuits and impedance of the planar mount type solid electrolyte condenser Particularly, it is dearly understood that the Embodiments 1 to 7 are excellent especially in their electrostatic capacity, leak current and the number of generated short circuits, compared with the Reference Examples 1 to 4.

The excellent sticking and adhesion between the conductive polymer solid electrolyte and the separator are obtained in the solid electrolyte condenser of the present invention. Particularly, the high frequency impedance of the Embodiments 1 to 7 become lower than the References 1 to 4 wherein the separators are the glass fiber nonwoven fabric, the carbonized electrolytic paper, and polypropylene wet nonwoven fabric.

In addition to the excellent sticking and adhesion of the separator with the solid electrolyte such as TCNQ, polyethylenediokxythiophene, polyethylenedioxythiophenepolystyrenesulfonic acid, or polypyrrole, polyethyleneterephthalate as polyester resin is highly heat-resistive. Therefore, the impedance is hardly changed even after the reflow treatment, thereby raising a reliability of the planar mount type solid electrolyte condenser.

Particularly, the graft copolymerization resin of sulfonic acid modified polyethyleneterephthalate and acryl is added in the conductive polymer solution is added as a binder to increase the sticking with the separator fiber. As a result, the sticking strength between the fiber and the conductive polymer becomes stronger, the impedance change after the reflow treatment becomes minimum. Thus, the excellent performances can be guaranteed in the solid electrolyte condenser.

On the other hand, in the solid electrolyte condenser using the separator as shown in the Reference Examples 1 to 4, the glass fiber nonwoven fabric are too thick to manufacture a solid electrolyte condenser in a prescribed size. Further, the solid electrolyte condensers as shown the Reference Examples have a disadvantage that the rate of generating short circuits is high due to contacts of the anode foil with the cathode foil due to a weak strength of the separator. Further, the condenser product has a disadvantage that the impedance change after the reflow treatment is great, because the fiber and the conductive polymer are weak in the sticking strength and are melted during the reflow soldering, thereby generating an outgas.

A diameter of the separator fiber smaller than 0.01 dtex may possibly cause frequent cut-off is of the separator during the rolling the condenser element, while the fiber diameter greater than 3 dtex degrades the high frequency impedance. Therefore, those diameters are not preferable.

The conductive polymer used in the present invention contains at least one binder ingredient selected among polyvinylalchol, polyvinylacetate, polycarbonate, polyacrylate, polymethacrylate, polystyrene, polyurethane, polyacrylonitrile, polybutadiene, polyisoprene, polyether, various kinds of polyesters, polyamide, polyimide, butylal resin, silicone resin, melamine resin, alkyd resin, cellulose, nitrocellulose, various kinds of epoxy resin, and all of their derivatives.

The polyester may be selected among polyethyleneterephthalate, carbonyl modified polyethyleneterephthalate, sulfonic acid modified polyethyleneterephthalate, polybutyleneterephthalate, carbonyl modified polyethyleneterephthalate, sulfonic acid modified polybutyleneterephthalate, while the epoxy resin may be selected among bisphenol A type epoxy, bisphenol F type epoxy, alicyclicepoxy, nitrile rubber modified epoxy.

In the following, the reason why the impedance characteristic of the solid electrolyte condenser of the present invention is improved is explained. The above-mentioned reason is that the polyester resin is well attached to polyethylenethiophene family due to their similar compatibility parameters. For example, the compatibility parameter of polyethyleneterephthalate as the polyester resin is 11, while that of ethylene dioxythiophane is also 11. Particularly, among the polyester resins, the polyester fiber of polyethyleneterephthalate family containing the copolymerization ingredients of carboxyalkoxybenzensulfonic acid and its derivatives and the polyester fiber of polyethyleneterephthalate family containing the copolymerization ingredients of alkylgrilcolglycol and its derivatives have the compatibility parameters similar to that of solid electrolyte of polyethylenedioxythiophene family. Therefore, the sticking and adhesion of the separator fiber with the solid electrolyte are made stronger than the combination of the separator fiber and the solid electrolyte of pother synthetic resins, thereby making it possible to improve the impedance characteristic at higher frequency.

The compatibility parameters of materials other than polyethyleneterephthalate (PET) are, for example, 16 for cellulose, smaller then or equal to 5 for carbonated cellulose, 8 for polypropylene frequently used as the unwoven fabric. Thus, those parameters are far from that of ethylenedioxythiophene.

Further, heat-resistive resins which are not degraded even under an exposure in the atmosphere of near 250° C. are desired recently, for a measure to a lead (Pb)-free reflow soldering. Therefore, polyethyleneterephthalate is suitable to the lead-free reflow soldering due to its high melting point of near 260° C., thereby obtaining a technical advantage that the separator and the solid electrolyte condenser are characterized by their high heat-resistivity.

Mixed separators containing fibers manufactured by the wet method suitable for improving the high frequency impedance may preferably be a mixed separator containing at least one fiber among polyethyleneterephthalate fiber, vinylon fiber, nylon fiber, rayon fiber, polyethylene fiber, polypropylene fiber, trimethylpentene fiber, polyphenysulfide fiber, celluloid or cellulose nitrate, and cellulose family represented by Manira hemp. In this case, the concentration of the polyester fiber of polyethyleneterephthalate family containing the copolymerization ingredients of carboxyalkoxybenzenesulfonic acid and its derivatives is preferably greater than or equal to 50 weight % in the mixed separator from the point of the heat-resistivity.

We claim:

1. A separator for a solid electrolyte condenser, comprising:

a nonwoven fabric containing polyester resin or its derivative;

a diameter of fiber of said nonwoven fabric is 0.01 to 3 dtex; and said nonwoven fabric contains said polyester resin of polyethyleneterephthalate family containing carboxyalkoxybenzenesulfonic acid and its derivatives as a copolymerization ingredient.

2. The separator according to claim 1, wherein said carboxyalkoxybenzenesulfonic acid and its derivatives are 3,5-dicarboxymethoxybenzenesulfonic acid and its derivatives.

3. The separator according to claim 1, wherein said nonwoven fabric contains said polyester resin of polyethyleneterephthalate family containing alkylglycol and its derivatives as a copolymerization ingredient.

4. The separator according to claim 3, wherein said alkylglycol and its derivatives are diethyleneglycol and its derivatives.

5. The separator according to claim 1, wherein said nonwoven fabric contains:

polyester resin of polyethyleneterephthalate family containing carboxyalkoxybenzenesulfonic acid and its derivatives as a copolymerization ingredient; and polyester resin of polyethyleneterephthalate family containing alkylglycol and its derivatives as a copolymerization ingredient.

6. The separator according to claim 5, wherein a concentration of said polyester resin of polyethylenephthalate family containing carboxyalkoxybenzenesulfonic acid and its derivatives as a copolymerization ingredient is greater than or equal to 50 weight %.

7. The separator according to claim 1, wherein:

a thickness of said separator is in a range of 20 to 100 $\mu$m; and a density of said separator is in a range of 0.30 to 0.70 g/cm$^3$.

8. A solid electrolyte condenser, comprising:

an anode foil;

a cathode foil;

a separator between said anode foil and said cathode foil;

solid electrolyte between said anode foil and said cathode foil;

a surface of said anode foil is etched and insulating oxide film is formed on said surface;

a surface of said cathode foil is at least etched;

said separator is sandwiched between said anode foil and said cathode foil and is rolled together with said anode foil and said cathode foil to form a condenser element;

said solid electrolyte is provided between said anode oil and said cathode foil;

said separator is a nonwoven fabric containing polyester resin or its derivative;

a diameter of fiber of said nonwoven fabric is 0.01 to 3 dtex; and said nonwoven fabric contains said polyester resin of polyethyleneterephthalate family containing carboxyalkoxybenzenesulfonic acid and its derivatives as a copolymerization ingredient.

9. The solid electrolyte condenser according to claim 8, wherein said solid electrolyte is a conductive polymer containing at least one material selected from among tetracyanoquinodimathanecomplex salt and its derivatives, polypyrrole and its derivatives, polyaniline and its derivatives, polythiophene and its derivatives, polyethelenedioxythiophene and its derivatives, polyethelenedioxyphenethiophenepolystyrenesulfonate and its derivatives.

10. The solid electrolyte condenser according to claim 9, wherein said conductive polymer contains at least one binder ingredient selected from among polyvinylalcohol, polyvinylacetate, polycarbonate, polyacrylate, polymethacrylate, polystyrene, polyurethane, polyacrylonitrile, polybutadiene, polyisoprene, polyether, a plurality of polyesters, polyamide, butylal resin, silicone resin, malamine resin, alkyld resin, cellulose, nitrocellulose, a plurality of epoxy resins, and all of their derivatives.

11. The solid electrolyte condenser according to claim 10, wherein said plurality of polyesters are selected from among polyethyleneterephthalate, carbonyl modified polyethyleneterephthalate, sulfonic acid modified polyethyleneterephthalate, polybutyleneterephthalate, carbonyl modified polyethyleneterephthalate, sulfonic acid modidified polybutyleneterephthalate.

12. The solid electrolyte condenser according to claim 10, wherein said plurality of epoxy resins are selected from among bisphenol A type epoxy, bisphenol F type epoxy, alicyclicepoxy, nitrile rubber modified epoxy.

13. The solid electrolyte condenser according to claim 8, wherein said carboxyalkoxybenzenesulfonic acid and its derivatives are 3,5-dicarboxymethoxybenzenesulfonic acid and its derivatives.

14. The solid electrolyte condenser according to claim 8, wherein said nonwoven fabric contains said polyester resin of polyethyleneterephthalate family containing alkylglycol and its derivatives as a copolymerization ingredient.

15. The solid electrolyte condenser according to claim 14, wherein said alkylglycol and its derivatives are diethyleneglycol and its derivatives.

16. The solid electrolyte condenser according to claim 8, wherein said nonwoven fabric contains:

polyester resin of polyethyleneterephthalate family containing carboxyalkoxybenzenesulfonic acid and its derivatives as a copolymerization ingredient; and polyester resin of polythyleneterephthalate family containing alkylglycol and its derivatives as a copolymerization ingredient.

17. The solid electrolyte condenser according to claim 16, wherein a concentration of said polyester resin of polyethylenephthalate family containing carboxyalkoxybenzenesulfonic acid and its derivatives as a copolymerization ingredient is greater than or equal to 50 weight %.

18. The solid electrolyte condenser according to claim 8, wherein:

a thickness of said separator is in a range of 20 to 100 $\mu$m; and a density of said separator is in a range of 0.30 to 0.70 g/cm$^3$.

* * * * *